United States Patent [19]
Thorner

[11] Patent Number: 5,764,735
[45] Date of Patent: Jun. 9, 1998

[54] DEVICE FOR MULTIMEDIA COMMUNICATION

[75] Inventor: Jan Thorner, Vasby, Sweden

[73] Assignee: Telia AB, Farsta, Sweden

[21] Appl. No.: 632,439

[22] PCT Filed: Oct. 14, 1994

[86] PCT No.: PCT/SE94/00963

§ 371 Date: Jun. 17, 1996

§ 102(e) Date: Jun. 17, 1996

[87] PCT Pub. No.: WO95/12270

PCT Pub. Date: May 4, 1995

[51] Int. Cl.[6] .................................................. H04M 11/00
[52] U.S. Cl. ................................................... 379/93.07
[58] Field of Search ................... 379/93–100, 90, 379/93.01, 93.05–93.09, 93.11, 93.14, 93.26–93.29, 93.31–93.34, 90.01, 100.01, 93.25, 100.08, 100.09, 100.11

[56] References Cited

U.S. PATENT DOCUMENTS 4,837,797  6/1989  Freeny, Jr. .
4,955,019  9/1990  Mizuhara et al. .
4,998,248  3/1991  Matsuzaki .................................. 379/94

FOREIGN PATENT DOCUMENTS 0 339 476   11/1989  European Pat. Off. .
0 477 627    4/1992  European Pat. Off. .
WO 93/22884 11/1993  WIPO .

*Primary Examiner*—Wing F. Chan
*Attorney, Agent, or Firm*—Oblon, Spivak, McClelland, Maier & Neustadt, P.C.

[57] ABSTRACT

The present invention concerns a device for communication networks comprising a connection member and network database. A first subscriber, equipped with a multimedia terminal, makes a connection to a second subscriber, equipped with a number of services connected to various terminals. The first subscriber wants to use several facilities in parallel during the communication. This is recorded in the network database which ensures that the relevant services at the second subscriber are used for the connection. Thereafter the subscribers can communicate with each other over several parallel facilities. In addition, the first subscriber has the ability to request, during the communication, the connection of further facilities which were not connected at the beginning of the communication.

24 Claims, 2 Drawing Sheets

5,764,735

DEVICE FOR MULTIMEDIA COMMUNICATION

TECHNICAL FIELD

The present invention concerns a device for the simultaneous transmission of several types of information. In future telecommunication networks the transmission of information will take place via intelligent terminals. These are capable of sending information such as speech, data or facsimile simultaneously. For an unknown period of time there will also be older terminals in the telecommunication networks which can only send one type of information at a time.

PRIOR ART

Today's telecommunication networks send information between two equivalent terminals. An example of this is transmission between two computer terminals, two or more telephones, etc. Intelligent networks have been introduced or are planned in various places in the world. Network databases, SCP, are set up in the intelligent networks. The network databases are used by the network for memorizing what facilities various subscribers have in their respective terminals. The network databases are also used in the event of onward connection of calls to another service.

U.S. Pat. No. 5,018,191 describes a method for connecting different types of calls. The invention allows the users to send information other than speech without using special call numbers. The usual call number is used by the caller, who is equipped with an intelligent terminal, whereupon an indicator shows which type of transmission is involved. The information is translated into the designated recipient number and the connection then takes place. In this case the transmission concerns only one type of communication at a time and it is not considered feasible to change the type of communication while the call is in progress.

U.S. Pat. No. 5,023,868 describes a device for the automatic connection of calls. The device includes a computer which has been connected to an exchange. A number of terminals are connected to the exchange. When a call reaches the system, the computer initiates a call connection to an alternative destination depending for example upon the type of call.

U.S. Pat. No. 5,008,930 concerns the onward connection of calls consisting of speech and data. In the onward connection of a call from one terminal consisting of a telephone and a computer terminal to another, the second station's terminal number is sent to the host database which then obtains the identity of the relevant computer terminal from a table.

DESCRIPTION OF THE INVENTION
TECHNICAL PROBLEM

In the future, intelligent terminals will be capable of sending different types of information simultaneously. This means that speech, data, images, etc., will be sent simultaneously between the terminals while the communication is in progress. In those cases where either party is not equipped with an intelligent terminal, the problem arises of, for example, where to address the information. Depending upon where the subscriber is situated, the information can be received at different reception locations.

The user of the intelligent terminal wishes to use the supplementary information to initiate the required communication without needing to look up and call the reception location via special call numbers. In the intelligent network, information concerning the subscribers' telephone numbers for different facilities is stored in the network database. Information concerning the subscriber's alternative residences is also stored in the network database. This information is required to be used regardless of where the subscriber is located.

A person communicating via an intelligent terminal can request connection to one or more facilities at the receiver upon initiating the connection, or may want to connect further facilities while the call is in progress. It is, therefore, necessary to be able to initiate new facilities while the communication is in progress. In addition, it is desirable for one and the same call number to be used when initiating a communication regardless of what facility/facilities is/are to be used. It is also desirable that the subscriber does not need to think about what facilities the other party has access to. This information will be available in the network, which also informs the parties of this, if required.

The present invention provides a solution to the problem described above.

SOLUTION

The present invention concerns a device for telecommunication networks. The network comprises, on the one hand, the network and, on the other hand, the functions in the network which permit connection of subscribers in the network who want to communicate with each other. The network is also equipped with a network database. The said network database contains, among other things, information about the subscribers such as call number, type(s) of terminal(s), requirements to receive calls on different subscriber numbers at different times of the day, etc. The subscriber equipment consists, on the one hand, of ordinary terminals which handle one type of communication at a time, such as speech, image, data, etc., and, on the other hand, intelligent terminals which can be used for different types of information transmission both separately and simultaneously.

A first subscriber calls the telecommunication network in the usual way, the subscriber giving a call number for the second subscriber. But since the first subscriber is assumed to have an intelligent terminal he also indicates the type(s) of communication required. The network sends the information to the network database set up in the network. The network database holds information about subscribers in the network, for example, call numbers for different terminals at subscribers who do not have intelligent terminals, different call numbers for the same subscriber with different call numbers at different times of the day, etc. The network database instructs the network to set up the number of connections which are needed for the required communication. While the communication is in progress the subscriber can also request that terminals other than those initially connected be added into the communication. Also, in this case, the network database ensures that the required connections are set up. The communication then takes place simultaneously over the connections which have been set up. The subscriber with the intelligent terminal carries out all communication on his single terminal while the subscriber with conventional terminals communicates over a connection for each terminal.

As the network database holds information about the subscribers' terminals, it can also determine whether different terminals belonging to the subscribers can work together or not. In addition, information can be provided about whether the terminals can communicate with each other under certain conditions which the subscribers have to take note of.

The subscribers can also inform the network database that communication on certain terminals, or all of them, is to be redirected on the basis of the time of day, day of the week, etc. In addition, the network database can be provided with information about different subscriber numbers which the subscriber uses and which facilities are applicable to these. In the event of a call to the subscriber, one and the same subscriber number is used. This is used by the network database in accordance with the above for connecting subscribers and required facilities.

In a further development of the invention the network database informs the first subscriber whether second subscribers do not have certain types of communication which the first subscriber wished to use. This means that the network database, with its knowledge of the subscribers' access to equipment and services, first checks whether or not the requested types of communication are feasible. Depending upon where the second subscriber receives the information, access to different types of communication can vary. The first subscriber is not required to keep track of this, but only to inform the network database what type/types of communication is/are required, where-upon the network database handles the connection and informs the first subscriber in those cases where one or more of the communication types cannot be used. In addition, the first subscriber can simultaneously communicate via the multimedia terminal with several other subscribers via different types of communication. This means that the first subscriber can have a speech connection with one subscriber, facsimile transmission with another, data transfer with a third, etc. This type of communication can also concern one and the same second subscriber, but with this subscriber receiving the information at different addresses, for example, as a result of the second subscriber not being able to receive certain types of communication at the place where he is located at the time.

ADVANTAGES

The invention means that future subscribers equipped with multimedia terminals, i.e., terminals which simultaneously handle communication via several different information media, e.g., image, speech, data, etc, can communicate simultaneously with a subscriber who does not have a multimedia terminal but has a number of ordinary terminals.

Because the subscribers' different call numbers are held in the network database, a single call number can be used for all the different communications which are requested. The calling party indicates only the type of information transfer intended. The network database then identifies the subscriber numbers to which connections are to be made in order to set up the required facilities.

The invention thus provides a simplified procedure for connection between subscribers since they only need to remember one call number regardless of the facility required.

The ability to communicate over several media simultaneously has the advantage that the parties can comment on and discuss information of various kinds at one and the same time.

PREFERRED EMBODIMENT

Figure 1:
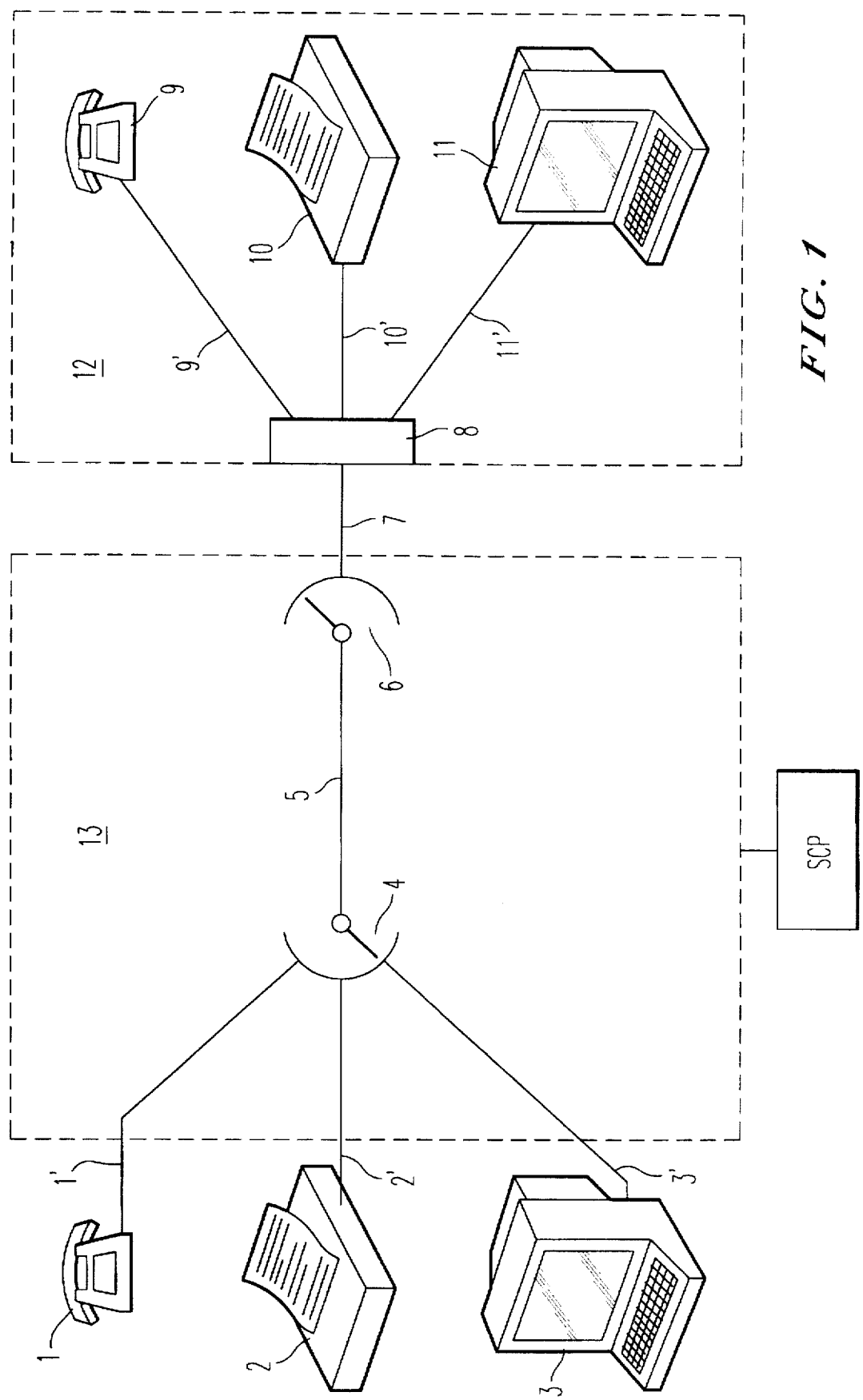
FIG. 1 shows the invention in block diagram form.

The inventive concept is described below with reference to the figures and the terminology therein.

The present invention concerns a device for communication networks comprising a connecting member and network database. A first subscriber, equipped with a multimedia terminal, is connected to a second subscriber equipped with a number of services connected to different terminals. The first subscriber wants to use several facilities in parallel during the communication. This is recorded in the network database, which ensures that the relevant service at the second subscriber is used in the connection. Thereafter the subscribers can communicate with each other using several parallel facilities. During the communication the first subscriber can also request the connection of further facilities which were not connected when the communication commenced.

A first subscriber is allocated a number of terminals 1, 2 and 3. Terminal 1 is used for speech communication, terminal 2 for facsimile transmission and terminal 3 for data transmission. Terminals other than those shown can also be used, for example, image transmission, but this is not essential for the invention. The essential thing is that the subscriber is able to communicate via a number of terminals with different facilities in the network.

The respective terminals are connected by cables 1', 2' and 3' to the communications facilities in the communication network.

At least one network database, the SCP, is connected to the network. The network database holds information concerning the subscribers such as a general call number and individual call numbers for different terminals for the subscriber concerned. In addition, the network database, the SCP, is informed about temporary and permanent changes concerning the subscriber regarding terminals possessed, call number, etc.

A second subscriber, 12, is equipped with a multimedia terminal. This controls simultaneous communication using several different facilities at the same time. The description mentions speech communication, 9, facsimile communication, 10, and data communication, 11. Other facilities can also be available in the terminal, provided that these are compatible with the network. In the multimedia terminal the above-mentioned facilities are combined in a device 8. The device 8 combines the information in a broad-band channel for transmission to the communication network. The division of the information and distribution to the intended terminals at the subscriber with conventional terminals take place within the communication network. In principle, the division can take place anywhere within the communication network.

The subscriber with the intelligent (multimedia) terminal can, like the subscriber with the ordinary terminals, redirect all or certain facilities to alternative response locations. This means that the subscribers in certain cases have access to intelligent terminals and in other cases only have access to conventional terminals.

In the event of a call from the subscriber with the intelligent terminal, 12, a call number is sent in the usual way to the communication network, 13. In connection with the call number, information is transmitted concerning the required facilities. Let us assume that the subscriber wants to set up a communication with speech and data. This is recorded in the communication network. The system then redirects the information to a network database, the SCP.

The network database records the call number and what types of communication are required. The network database then determines which call numbers are applicable at that time for the recipient. In this case the call numbers for the speech terminal, 1, and the data terminal, 3, are produced. In the event that any of the terminals is not available, information about this is returned to the calling party who is thereby given the opportunity to cancel the type of communication concerned. Connection can also be requested to the facility which is free with the request that an engaged facility is monitored and connected when it becomes free.

Let us assume that the called subscriber has terminals which are free. The SCP then ensures that the connections 1', 2', 5, 6, 7 are connected between the subscribers. After the called subscriber has answered the call, the subscribers communicate via the respective terminals. During the communication the calling party finds that he wants to send a facsimile message. A call function is, therefore, initiated by the subscriber, causing a call signal to be sent to the communication network. As on the previous occasion, the signal is transmitted to the network database. The network database identifies the second subscriber, since the call number is not transmitted from the calling party in this case. Following this, the communication routes between the subscribers are connected in accordance with what was described above for setting up.

Figure 2:
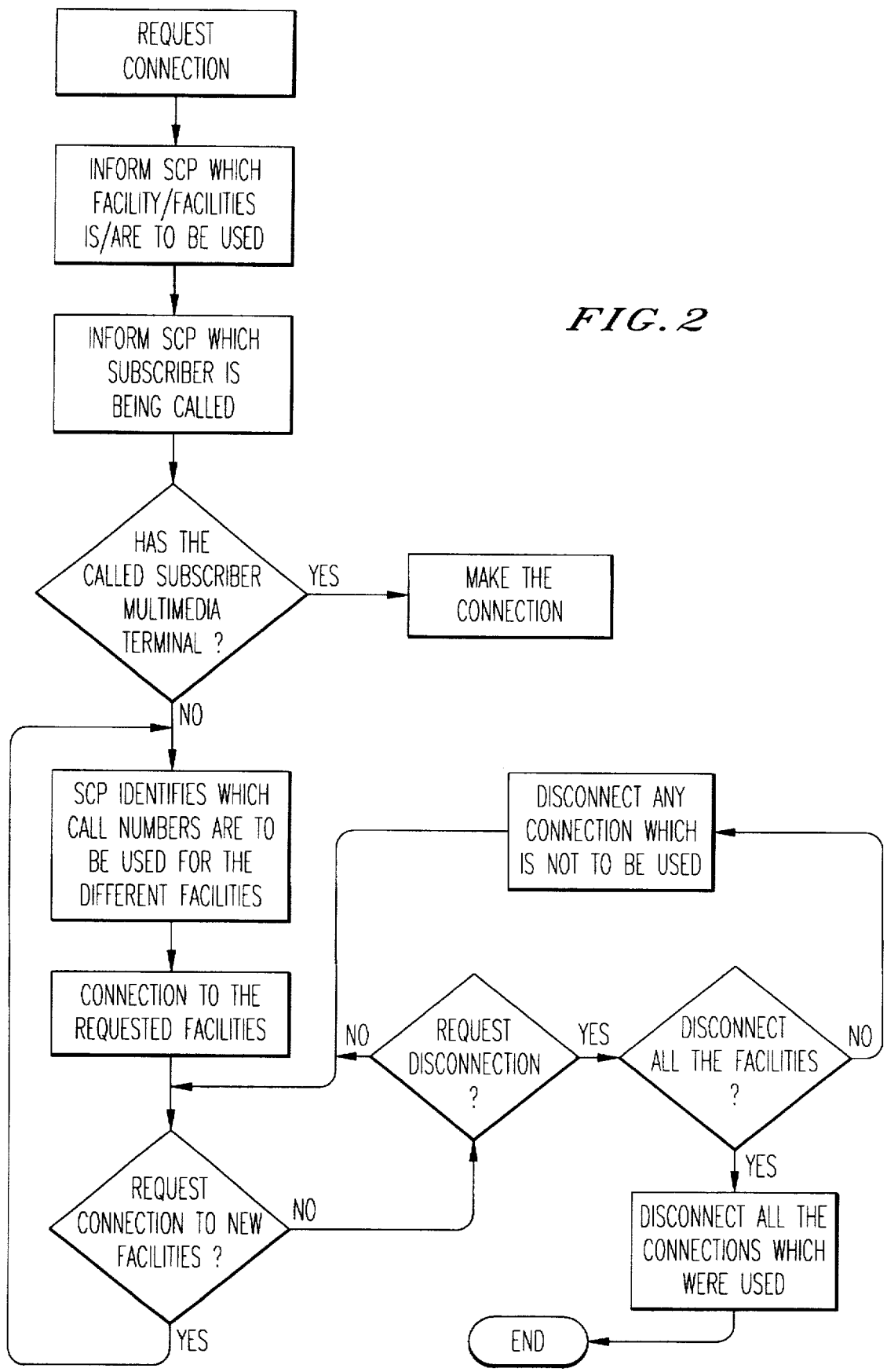
FIG. 2 shows a flow chart for the invention.

With reference to FIG. 2 the following takes place.

A subscriber requests setting up and informs the connection functions in the communication network which facilities are required for the communication and supplies an identification number for identifying the receiving subscriber. The identification number can be a special identification number and also any number on any of the selected subscriber's terminals. The information is received by the communication system's connection device which forwards the information to the network database, SCP. The SCP then determines which subscriber number(s) the receiving subscriber is/are to use for the required connection. In those cases where the receiving subscriber is equipped with a multimedia terminal, the connection is made to one subscriber number. If the receiving subscriber has only ordinary terminals, SCP sets up connection to the required terminals on the relevant receiving subscriber numbers.

The network thereafter checks, during the duration of the connection, whether new requests for the connection of further facilities are received. If this takes place, the SCP is informed of this, whereupon identification and connection of the facility/facilities takes place as described above.

If no request for the connection of new facilities has been received, checks are made for disconnection requests. In the cases where the connection is to continue, a check is again made on whether new facilities are to be connected. When a request for disconnection is received, a check is made on whether all the facilities are to be disconnected or not. If all the facilities are to be disconnected, the communication is terminated. If only certain facilities are to be terminated, these are disconnected, after which a check is made on whether a request for the connection of new facilities has been made. After this, the cycle continues as described above until the communication has been terminated.

The invention is not restricted to the embodiment described above but can be subject to modifications within the scope of the following patent claims and inventive concept.

I claim:

1. Device for telecommunication networks, for communication between a first subscriber, equipped with a multimedia terminal, which can be used for different communication facilities, and a second subscriber equipped with various terminals designed for different communication facilities, and a network database holding information about the subscribers' subscriber numbers and where the subscribers communicate simultaneously via several communication facilities, characterized in that the multimedia terminal is designed to initiate a request for connection to one of the second subscriber's terminals, dependent upon the effect of the first subscriber's equipment, in that the network database records the request and what communication facilities are required, in that the network database identifies the relevant terminal of the second subscriber's terminals with associated subscriber number(s), and in that the subscribers' terminals are inter-connectable and able to communicate with each other via at least two different communication facilities simultaneously.

2. Device according to claim 1, characterised in that the network database identifies, via any of the second subscriber's subscriber numbers, other subscriber numbers associated with the second subscriber and the communication facilities that are associated with the respective subscriber numbers.

3. Device according to claim 1, characterized in that the second subscriber informs the network database via his terminal which subscriber number is to be used when the second subscriber is movable within the network and the original subscriber numbers are used for calls to the second subscriber regardless of his physical location within the communication network.

4. Device according claim 1, characterized in that the network database contains information about which communication facilities are associated with the different subscriber numbers.

5. Device according claim 1, characterized in that the first subscriber initiates connection of further communication facilities during any stage of an on-going communication without interfering with the communication already set up.

6. Device according claim 1, characterized in that the network database determines whether the second subscriber is affected by the communication requested by the first subscriber before the connection is made.

7. Device according claim 1, characterized in that the second subscriber receives information via different communication facilities on services which are situated in different geographical locations.

8. Device according claim 1, characterized in that the network database informs the first subscriber if the second subscriber does not have a certain communication facility or certain communication facilities which it is desired to use.

9. Device according claim 1, characterized in that the first subscriber simultaneously communicates via the multimedia terminal with several other subscribers' terminals via different communication facilities.

10. Device according to claim 2, characterized in that the second subscriber informs the network database via his terminal which subscriber number is to be used when the second subscriber is movable within the network and the original subscriber numbers are used for calls to the second subscriber regardless of his physical location within the communication network.

11. Device according to claim 2, characterized in that the network database contains information about which communication facilities are associated with the different subscriber numbers.

12. Device according to claim 3, characterized in that the network database contains information about which communication facilities are associated with the different subscriber numbers.

13. Device according to claim 2, characterized in that the first subscriber initiates connection of further communication facilities during any stage of an on-going communication without interfering with the communication already set up.

14. Device according to claim 3, characterized in that the first subscriber initiates connection of further communication facilities during any stage of an on-going communication without interfering with the communication already set up.

15. Device according to claim 4, characterized in that the first subscriber initiates connection of further communication facilities during any stage of an on-going communication without interfering with the communication already set up.

16. Device according to claim 2, characterized in that the network database determines whether the second subscriber is affected by the communication requested by the first subscriber before the connection is made.

17. Device according to claim 3, characterized in that the network database determines whether the second subscriber is affected by the communication requested by the first subscriber before the connection is made.

18. Device according to claim 4, characterized in that the network database determines whether the second subscriber is affected by the communication requested by the first subscriber before the connection is made.

19. Device according to claim 5, characterized in that the network database determines whether the second subscriber is affected by the communication requested by the first subscriber before the connection is made.

20. Device according to claim 1, wherein
said multimedia terminal can be used for at least one of telephony, facsimile, and telex.

21. Device according to claim 1, wherein
said various terminals are designed for at least one of a telephone apparatus, facsimile equipment, and a modem.

22. A system for a telecommunication network, comprising:
a primary terminal operated by a first subscriber and configured to communicate in a first modality and a second modality of a plurality of communication modalities;

a plurality of secondary terminals operated by a second subscriber, wherein a first secondary terminal of said plurality of secondary terminals is configured to communicate in said first modality, and wherein a second secondary terminal of said plurality of secondary terminals is configured to communicate in said second modality;

a network database; and means for completing connections between said primary terminal and said plurality of secondary terminals, wherein said primary terminal comprises means for issuing a first connection request for a first connection in said first modality from said primary terminal and means for issuing a second connection request for a second connection in said second modality from said primary terminal at a time no earlier than a time of said first connection request, wherein said network database comprises means for recording said first connection request and identifying said first secondary terminal based on said first connection request and means for recording said second connection request and identifying said second secondary terminal based on said second connection request.

23. A system according to claim 22, wherein
said primary terminal can be used for at least one of telephony, facsimile, and telex.

24. A system according to claim 22, wherein said plurality of secondary terminals are designed for at least one of a telephone apparatus, facsimile equipment, and a modem.

* * * * *

UNITED STATES PATENT AND TRADEMARK OFFICE
CERTIFICATE OF CORRECTION

PATENT NO. : 5,764,735
DATED : June 9, 1998
INVENTOR(S) : Jan THORNER

It is certified that error appears in the above-identified patent and that said Letters Patent is hereby corrected as shown below:

On the title page, item [30], Foreign Application Priority Data is missing. It should be:

--[30]   Foreign Application Priority Data
  Oct. 26, 1993   [SE]   Sweden   ...........   9303508-7--

Signed and Sealed this

Second Day of February, 1999

Attest:

Attesting Officer

*Acting Commissioner of Patents and Trademarks*